(12) United States Patent
Yoon et al.

(10) Patent No.: US 11,128,516 B1
(45) Date of Patent: Sep. 21, 2021

(54) METHOD AND APPARATUS FOR CONSTELLATION DESIGN BASED ON STEPPED HIERARCHICAL MODULATION

(71) Applicant: IUCF-HYU (Industry-University Cooperation Foundation Hanyang University), Seoul (KR)

(72) Inventors: Dongweon Yoon, Seoul (KR); Seongjin Ahn, Seoul (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 0 days.

(21) Appl. No.: 17/089,187

(22) Filed: Nov. 4, 2020

(30) Foreign Application Priority Data

Jul. 3, 2020 (KR) .................... 10-2020-0081936

(51) Int. Cl.
*H04L 27/36* (2006.01)
*H04L 27/34* (2006.01)

(52) U.S. Cl.
CPC ................ *H04L 27/3416* (2013.01)

(58) Field of Classification Search
CPC ................................ H04L 27/3416
USPC ...................................... 375/298
See application file for complete search history.

(56) References Cited

U.S. PATENT DOCUMENTS

2017/0064519 A1* 3/2017 Li ................ H04L 12/18
2018/0351697 A1* 12/2018 Kim .............. H04W 28/04

FOREIGN PATENT DOCUMENTS

KR 10-2084083 B1 3/2020
KR 102084083 B1 * 3/2020

OTHER PUBLICATIONS

Seongjin Ahn, Dongweon Yoon, BER performance of Stepped θ-QAM, 2018 IEEE 3rd International Conference on Communication and Information Systems, (Year: 2018).*

* cited by examiner

*Primary Examiner* — Tanmay K Shah
(74) *Attorney, Agent, or Firm* — Novick, Kim & Lee, PLLC; Jae Youn Kim

(57) ABSTRACT

Disclosed are a method and an apparatus for a constellation design based on stepped hierarchical modulation. According to the present invention, there is provided an apparatus for a constellation design based on stepped hierarchical modulation comprising a processor and a memory connected to the processor, wherein the memory stores program instructions to be executed by the processor so as to generate an initial constellation including M (M is a natural number) signal points based on stepped θ-QAM, set a constellation parameter to control a degree of data protection, move signal points located in an m-th quadrant by a preset distance in a preset direction by applying the constellation parameter to the initial constellation, and map information bits encoded in the moved signal points.

9 Claims, 3 Drawing Sheets

METHOD AND APPARATUS FOR CONSTELLATION DESIGN BASED ON STEPPED HIERARCHICAL MODULATION

CROSS-REFERENCE TO RELATED APPLICATION

This application claims under 35 U.S.C. § 119(a) the benefit of Korean Patent Application No. 10-2020-0081936 filed on Jul. 3, 2020, the entire contents of which are incorporated herein by reference.

BACKGROUND

(a) Technical Field

The present invention relates to a method and an apparatus for a constellation design based on stepped hierarchical modulation.

(b) Background Art

Recently, in the broadcasting and communication industries, fields of broadcasting and wired/wireless contents have been gradually expanded due to the growth of UHD, IPTV, and online contents. In particular, as virtual reality and augmented reality technologies are advanced, the realistic content market has been largely formed and the amount of data is increasing. Accordingly, there is a need for a system for efficiently transmitting a large amount of data at high speed.

Hierarchical modulation provides different degrees of protection according to the relative importance of data in one channel, and the relatively important data is allocated to a base layer, and relatively less important data is allocated to an enhancement layer.

High-priority (HP) bits containing relatively important data are allocated to the base layer with the high degree of protection and low-priority (LP) bits containing relatively less important data are allocated to the enhancement layer with the low degree of protection, and the hierarchical modulation enables selective reception of some or all of these data according to a reception environment.

A main purpose of hierarchical modulation is to increase the degree of protection for the base layer, and for this purpose, a quadrangular M-QAM hierarchical modulation scheme based on SQAM has been mainly used.

The conventional constellation based on M-QAM hierarchical modulation has an overall shape of a quadrangle, and due to relatively large sizes of signal points located at quadrangular vertices, not only performance is deteriorated in terms of average symbol energy, but also the error probability is deteriorated.

In order to minimize the error probability, θ-QAM has been proposed, but recently, research to improve the error in a MIMO environment is urgently needed.

PRIOR ART DOCUMENT

[Patent Document]
(Patent Document 1) Korean Patent No. 10-2084083
The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. An object of the present invention is to provide a method and an apparatus for a constellation design based on stepped hierarchical modulation with excellent performance in terms of bit error probability.

In order to achieve the object described above, according to an aspect of the present invention, there is provided an apparatus for a constellation design based on stepped hierarchical modulation comprising a processor and a memory connected to the processor, wherein the memory stores program instructions to be executed by the processor so as to generate an initial constellation including M (M is a natural number) signal points based on stepped θ-QAM, set a constellation parameter to control a degree of data protection, move signal points located in an m-th quadrant by a preset distance in a preset direction by applying the constellation parameter to the initial constellation, and map information bits encoded in the moved signal points.

The encoded information bits mapped to the signal points may have two high-priority (HP) bits.

The two HP bits may be allocated to the most significant bit as 00, 10, 11, and 01 at signal points located in each quadrant 1, 2, 3, or 4, respectively.

In the program instructions, the remaining bits except for the most significant bit may be mapped through a layer labeling algorithm, which is a suboptimal algorithm for minimizing a Hamming distance between signal points.

The constellation parameter may be determined according to the following Equation.

$$a = \frac{d_h}{d_l} \qquad \text{[Equation]}$$

Wherein, α is a constellation parameter of α≥1, $2d_h$ is a minimum distance between two signal points located in adjacent quadrants, and $2d_l$ is a minimum distance between two signal points located in the same quadrant.

The signal points located in the m-th quadrant may be moved by $(\lambda_x(m), \lambda_y(m))$ by the constellation parameter, wherein $(\lambda_x(m), \lambda_y(m))$ may be determined according to the following Equation.

$$(\lambda_x(m), \lambda_y(m)) = ((-1)^{\lfloor m/2 \rfloor}\lambda, (-1)^{\lfloor (m+1)/2 \rfloor + 1}\lambda), m = 1,2,3,4 \qquad \text{[Equation]}$$

Wherein, λ is a shifting factor of λ≥0 and ⌊•⌋ is a floor function.

The constellation parameter is determined differently according to θ in the same λ and $d_l$ ($2d_l$ is a minimum distance between two signal points located in the same quadrant).

According to another aspect of the present invention, there is provided a method for designing a constellation based on stepped hierarchical modulation in an apparatus comprising a processor and memory, the method comprising: generating an initial constellation including K (K is a natural number) signal points based on stepped θ-QAM; setting a constellation parameter to control a degree of data protection; moving signal points located in an m-th quadrant by a preset distance in a preset direction by applying the constellation parameters to the initial constellation; and mapping information bits encoded in the moved signal points.

According to yet another aspect of the present invention, there is provided a computer readable program for performing the method.

According to the present invention, there are advantages of increasing distances between adjacent signal points between quadrants by applying a constellation parameter in an initial constellation based on stepped θ-QAM, and further enhancing a degree of data protection by allocating HP bits to the most significant bit of bits in each quadrant.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention.

Figure 1:
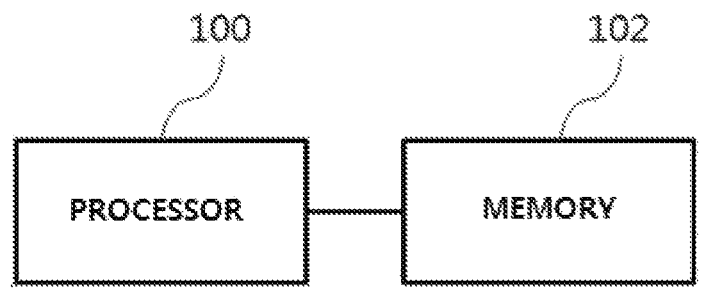
FIG. 1 is a diagram illustrating a configuration of an apparatus for a constellation design based on stepped hierarchical modulation according to a preferred embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In the present invention, various modifications may be made and various embodiments may be provided, and specific embodiments will be illustrated in the drawings and described in detail.

However, it is not intended to limit the present invention to a specific embodiment, and it is to be understood to cover all changes, equivalents, and substitutes included in the spirit and scope of the present invention.

Stepped hierarchical quadrature amplitude modulation (stepped θ-QAM, hereinafter referred to as stepped hierarchical modulation) is known to exhibit superior performance to SQAM in terms of average symbol energy and error probability.

The present invention proposes a scheme for designing a constellation and transmitting data based on such stepped hierarchical modulation.

FIG. 1 is a diagram illustrating a configuration of an apparatus for a constellation design based on stepped hierarchical modulation according to a preferred embodiment of the present invention.

As illustrated in FIG. 1, the apparatus according to the present embodiment may include a processor 100 and a memory 102.

The processor 100 may include a central processing unit (CPU) capable of executing a computer program or other virtual machines.

The memory 102 may include a nonvolatile storage device such as a fixed hard drive or a removable storage device. The removable storage device may include a compact flash unit, a USB memory stick, or the like. The memory 102 may also include volatile memories such as various random access memories.

Program instructions executable by the processor 100 are stored in such a memory 102.

The program instructions according to the embodiment generate an initial constellation including K (K is a natural number) signal points based on stepped θ-QAM, set a constellation parameter to control a degree of data protection, move signal points located in an m-th quadrant by a preset distance in a preset direction by applying the constellation parameter to the initial constellation, and map information bits encoded in the moved signal points.

According to the embodiment, the encoded information bits mapped to the signal points have two high-priority (HP) bits, and in this case, the two HP bits may be allocated to the most significant bit as 00, 10, 11, and 01 at signal points located in each quadrant 1, 2, 3, or 4, respectively.

Hereinafter, a process of designing a constellation based on stepped hierarchical modulation according to the embodiment will be described in detail with reference to the drawings and Equations.

First, a set of signal points located in an m-th quadrant is assumed as $S_m$.

Here, an initial value of $S_m$ is set as a signal point according to the stepped θ-QAM-based constellation, and respective signal points are denoted as $S_m^1, S_m^2, \ldots, S_m^p$ in order of from left to right and from top to bottom.

The stepped θ-QAM-based constellation has p=M/4 due to the same number of signal points in each quadrant, and coordinate pairs of an arbitrary signal point $s_m^q$ are denoted as $(x_m^q, y_m^q)$.

Figure 2:
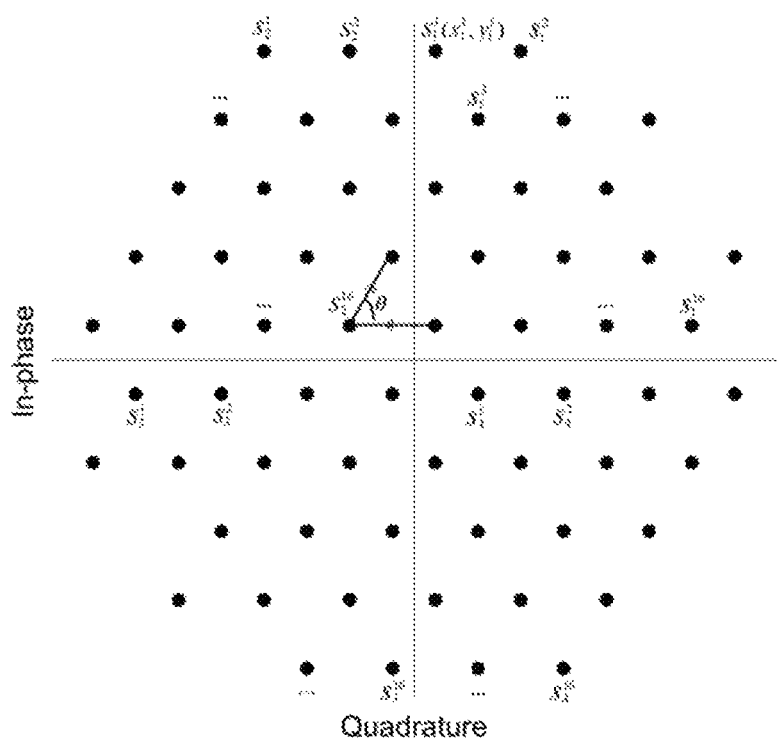
FIG. 2 is a diagram illustrating signal points and coordinate pairs of a 64-ary stepped θ-QAM.
Figure 3A:
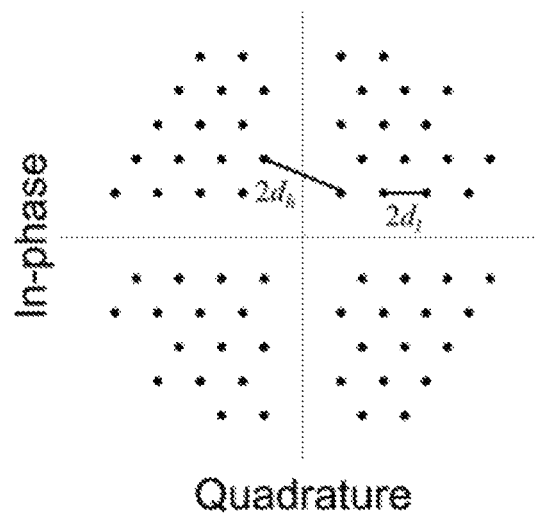
FIGS. 3A-3D are diagrams illustrating a stepped θ-based constellation designed according to a modulation order M when α=2, θ=60°.
Figure 3B:
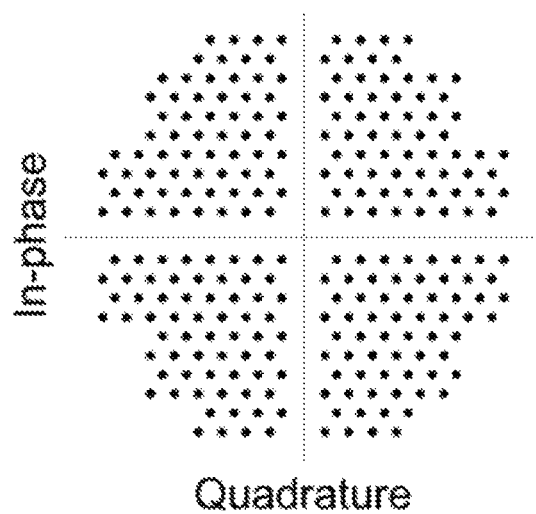
Figure 3C:
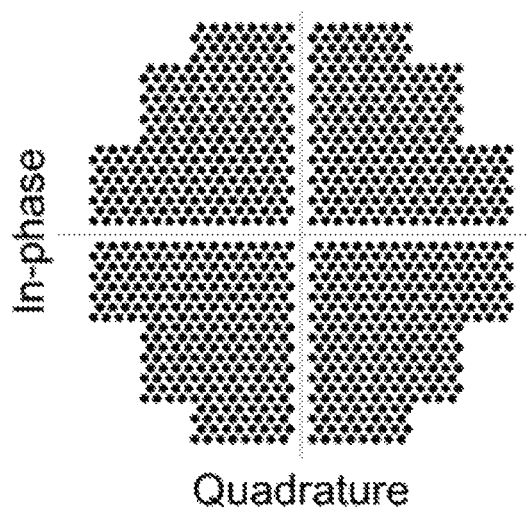
Figure 3D:
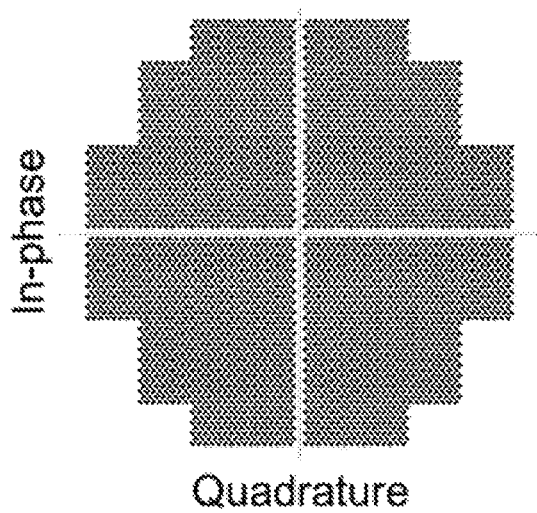

FIG. 2 is a diagram illustrating signal points and coordinate pairs of 64-ary stepped θ-QAM.

According to the embodiment, a constellation parameter α for controlling a relative degree of data protection is set.

The constellation parameter according to the embodiment is defined as follows.

$$a = \frac{d_h}{d_l} \quad \text{[Equation 1]}$$

Wherein, $2d_h$ is a minimum distance between two signal points located in adjacent quadrants, $2d_l$ is a minimum distance between two signal points located in the same quadrant, and α is a constant of α≥1.

According to the embodiment, a constellation based on stepped quadrature amplitude modulation (QAM) to which the constellation parameter as described above is applied is designed.

To this end, the signal points located in the m-th quadrant are moved by $(\lambda_x(m), \lambda_y(m))$, wherein $(\lambda_x(m), \lambda_y(m))$ is calculated as follows.

$$(\lambda_x(m), \lambda_y(m)) = ((-1)^{\lfloor m/2 \rfloor} \lambda, (-1)^{\lfloor (m+1)/2 \rfloor + 1} \lambda), m=1,2,3,4 \quad \text{[Equation 2]}$$

λ is a shifting factor of λ≥0 and $\lfloor \cdot \rfloor$ is a floor function.

In the case of the stepped θ-QAM, a lattice structure of the constellation forms a triangle, and according to the embodiment, the constellation parameter is determined differently according to θ in the same λ and $d_l$ ($2d_l$ is a minimum distance between two signal points located in the same quadrant).

This is generalized as follows according to the constellation design parameter θ.

$$a = \begin{cases} \dfrac{\sqrt{d_l^2 + 2\lambda d_l \sin(\theta/2) + \lambda^2}}{d_l}, & 0 < \theta \leq \dfrac{\pi}{3} \\ \dfrac{\sqrt{d_l^2(1-\cos(\theta)) + 2\lambda d_l(1-\cos(\theta)) + \lambda^2}}{d_l}, & \dfrac{\pi}{3} < \theta \leq f(d_i, \lambda) \\ \dfrac{\sqrt{d_l^2 + 2\lambda d_l \sin\theta + \lambda^2}}{d_l}, & f(d_i, \lambda) < \theta \leq \dfrac{\pi}{2} \end{cases}$$ [Equation 3]

Wherein, $f(d_i;\lambda)$ is calculated as follows.

$$f(d_i, \lambda) = \sin^{-1}\left[\dfrac{\lambda d_l + 2\lambda^2 + (d_l + \lambda)\sqrt{3d_l^2 + 4\lambda d_l + 4\lambda^2}}{2(d_l^2 + 2\lambda d_l + 2\lambda^2)}\right]$$ [Equation 4]

According to the embodiment, as α is increased, the degree of protection for the base layer is increased.

FIGS. 3A-3D are diagrams illustrating a stepped θ-based constellation designed according to a modulation order M when α=2, θ=60°, and illustrate cases of K=64, 256, 1024, and 4096, respectively.

As illustrated in FIGS. 3A-3D, the stepped θ-QAM-based constellation has 4-QAM as a base layer, and as the modulation order M increases, the shape of the constellation becomes stepped.

According to the embodiment, since the encoded information bits mapped to the signal points are set to have two high priority (HP) bits, it is referred to as 4/M-stepped θ-QAM.

In order to use the designed constellation for data transmission, bits need to be mapped to each symbol in an appropriate method.

Optimal bit mapping may be derived by finding the bit mapping with a minimum average Hamming distance through enumeration survey, but since the optimal bit mapping includes the number of M cases, it is impossible to be actually implemented as the modulation order increases.

Accordingly, according to an embodiment of the present invention, the bit mapping of 4/M-stepped θ-QAM is derived by applying a layer labeling algorithm, which is a suboptimal algorithm for minimizing a Hamming distance between adjacent symbols.

Since the 4/M-stepped θ-QAM has 4-QAM as the base layer, first, two bits are allocated to the most significant bit so as to be gray-mapped.

That is, 00, 10, 11, and 01 are allocated to the most significant bit in each quadrant 1, 2, 3, or 4.

Next, $\log_2$ M−2 bits are mapped to each signal point (symbol) over four steps.

In the bit mapping, $N_b$ is defined as the number of bits per symbol, $N_Q$=floor($N_b$/2), $N_I$=$N_b$−$N_Q$.

First, the maximum number of $2^{N_Q}$ symbols close to a quadrature axis (vertical axis) is selected from each row of $2^{N_Q}$ close to an in-phase axis (horizontal axis).

Second, the same bit is mapped to symbols having the same quadrature value for front $N_Q$−2 bits of the selected symbols, and gray-mapped between symbols of adjacent rows.

Third, the gray mapping is performed between symbols having the same quadrature value and between symbols of adjacent rows for upper $N_I$ bits of the previously selected symbols.

Fourth, bits are mapped to the remaining symbols so that the Hamming distance between adjacent symbols is minimized.

Figure 4:
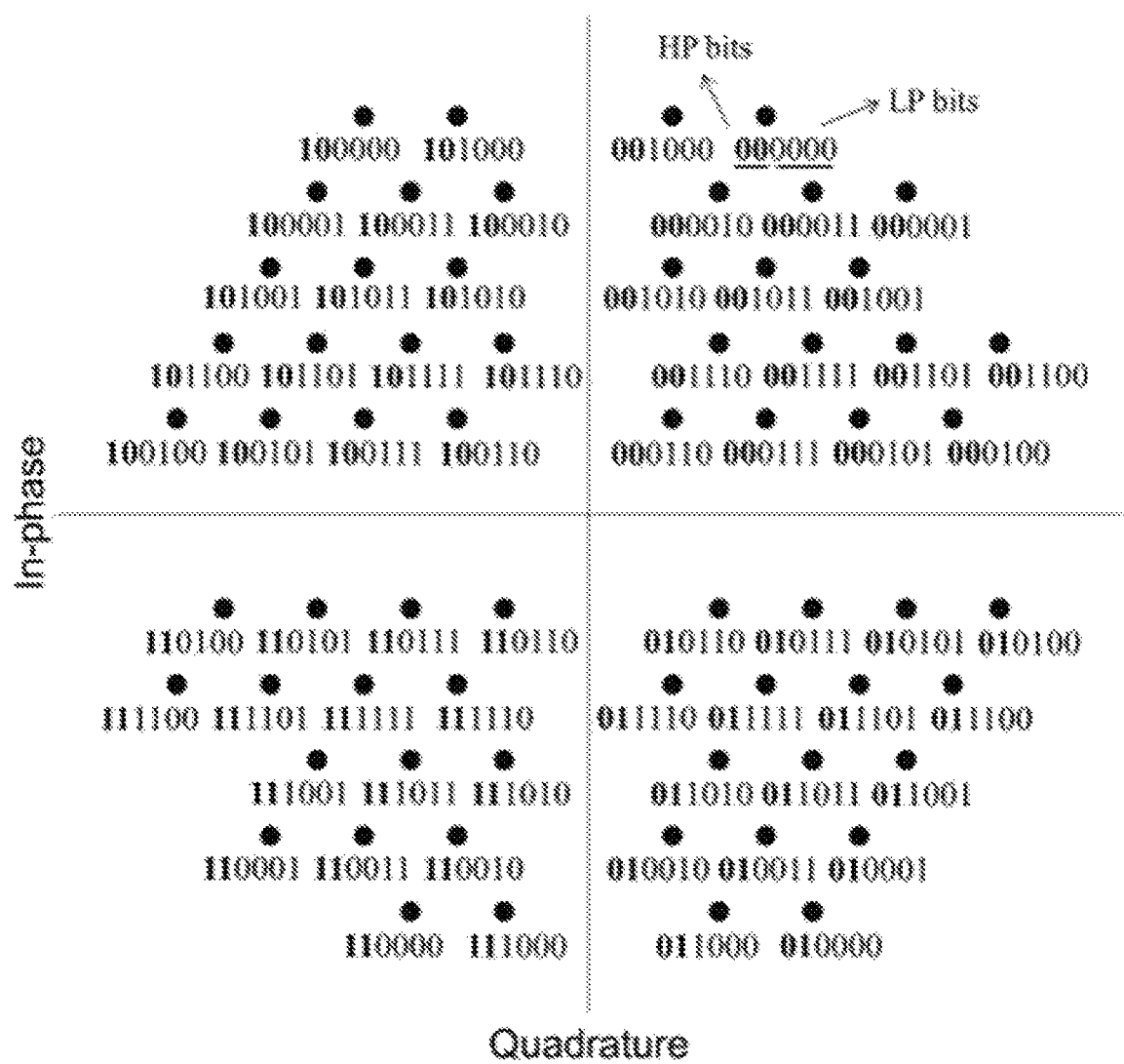
FIG. 4 is a diagram illustrating bit mapping of 4/64-stepped θ-QAM when α=2, θ=60°.

FIG. 4 illustrates bit mapping of 4/64-stepped θ-QAM when α=2, θ=60°.

The above-described embodiments of the present invention are disclosed for the purpose of illustration, and it should be understood to those skilled in the art that various modifications, changes, and additions will be made within the spirit and scope of the present invention, and these modifications, changes and additions belong to the appended claims.

What is claimed is:

1. An apparatus for a constellation design based on stepped hierarchical modulation, the apparatus comprising:
   a processor; and
   a memory connected to the processor,
   wherein the memory stores program instructions to be executed by the processor so as to:
   generate an initial constellation including M signal points based on stepped θ-QAM, wherein M is a natural number;
   set a constellation parameter to control a degree of data protection;
   move signal points located in an m-th quadrant by a preset distance in a preset direction by applying the constellation parameter to the initial constellation, wherein m is 1, 2, 3 or 4; and
   map information bits encoded in the moved signal points,
   wherein the constellation parameter is determined according to the following Equation:

$$a = \dfrac{d_h}{d_l},$$

wherein α is a constellation parameter of α≥1, $2d_h$ is a minimum distance between two signal points located in adjacent quadrants, and $2d_l$ is a minimum distance between two signal points located in the same quadrant.

2. The apparatus of claim 1, wherein the encoded information bits mapped to the signal points have two high-priority (HP) bits.

3. The apparatus of claim 2, wherein the two HP bits are allocated to the most significant bit as 00, 10, 11, and 01 at signal points located in each quadrant 1, 2, 3, or 4, respectively.

4. The apparatus of claim 3, wherein in the program instructions, the remaining bits except for the most significant bit are mapped through a layer labeling algorithm, which is a suboptimal algorithm for minimizing a Hamming distance between the signal points.

5. An apparatus for a constellation design based on stepped hierarchical modulation, the apparatus comprising:
   a processor; and
   a memory connected to the processor,
   wherein the memory stores program instructions to be executed by the processor so as to:
   generate an initial constellation including M signal points based on stepped θ-QAM, wherein M is a natural number;

set a constellation parameter to control a degree of data protection;

move signal points located in an m-th quadrant by a preset distance in a preset direction by applying the constellation parameter to the initial constellation, wherein m is 1, 2, 3 or 4; and map information bits encoded in the moved signal points, wherein the signal points located in the m-th quadrant are moved by $(\lambda_x(m), \lambda_y(m))$ by the constellation parameter, wherein $(\lambda_x(m), \lambda_y(m))$ is determined according to the following Equation:

$$(\lambda_x(m), \lambda_y(m)) = ((-1)^{\lfloor m/2 \rfloor}\lambda, (-1)^{\lfloor (m+1)/2 \rfloor + 1}\lambda), m=1,2,3,4,$$

wherein, $\lambda$ is a shifting factor of $\lambda \geq 0$ and $\lfloor \cdot \rfloor$ is a floor function.

6. The apparatus of claim 5, wherein the constellation parameter is determined differently according to $\theta$ in the same $\lambda$ and $d_l$ ($2d_l$ is a minimum distance between two signal points located in the same quadrant).

7. A method for designing a constellation based on stepped hierarchical modulation in an apparatus comprising a processor and a memory, the method comprising:

generating an initial constellation including K signal points based on stepped θ-QAM, wherein K is a natural number;

setting a constellation parameter to control a degree of data protection;

moving signal points located in an m-th quadrant by a preset distance in a preset direction by applying the constellation parameters to the initial constellation, wherein m is 1, 2, 3 or 4; and mapping information bits encoded in the moved signal points, wherein the constellation parameter is determined according to the following Equation:

$$a = \frac{d_h}{d_l},$$

wherein $\alpha$ is a constellation parameter of $\alpha \geq 1$, $2d_h$ is a minimum distance between two signal points located in adjacent quadrants, and $2d_l$ is a minimum distance between two signal points located in the same quadrant.

8. The method of claim 7, wherein the encoded information bits mapped to the signal points have two high-priority (HP) bits.

9. A non-transitory computer readable medium configured to store a program for performing the method according to claim 7.

* * * * *